(12) United States Patent
Ichinose

(10) Patent No.: US 8,761,566 B2
(45) Date of Patent: Jun. 24, 2014

(54) MOBILE TERMINAL DEVICE

(75) Inventor: Takashi Ichinose, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1027 days.

(21) Appl. No.: 12/234,963

(22) Filed: Sep. 22, 2008

(65) Prior Publication Data

US 2009/0154902 A1 Jun. 18, 2009

(30) Foreign Application Priority Data

Dec. 13, 2007 (JP) .............................. P2007-322551

(51) Int. Cl.
*H04N 9/80* (2006.01)
*H04N 5/76* (2006.01)

(52) U.S. Cl.
USPC ............. 386/83; 386/124; 386/239; 386/248; 386/291; 386/296; 386/299

(58) Field of Classification Search
USPC .................. 386/124, 239, 248, 291, 296, 299
See application file for complete search history.

(56) References Cited

U.S. PATENT DOCUMENTS

| | | | | |
|---|---|---|---|---|
| 2004/0240382 | A1* | 12/2004 | Ido et al. ....................... | 370/229 |
| 2004/0242204 | A1* | 12/2004 | Ido et al. ..................... | 455/412.1 |
| 2005/0073617 | A1 | 4/2005 | Takahashi | |
| 2005/0192054 | A1* | 9/2005 | Asada ........................... | 455/558 |
| 2006/0153526 | A1* | 7/2006 | Kimura .......................... | 386/83 |
| 2006/0252459 | A1* | 11/2006 | Lee ............................ | 455/556.1 |
| 2007/0026869 | A1* | 2/2007 | Dunko ......................... | 455/456.1 |
| 2008/0059533 | A1* | 3/2008 | Krikorian ................... | 707/104.1 |
| 2008/0274768 | A1* | 11/2008 | Toriumi et al. ............ | 455/556.1 |
| 2008/0299894 | A1* | 12/2008 | Natori et al. ................. | 455/3.06 |
| 2009/0085863 | A1* | 4/2009 | Panabaker et al. ............ | 345/156 |
| 2009/0196226 | A1* | 8/2009 | Shibao .......................... | 370/328 |

FOREIGN PATENT DOCUMENTS

| | | |
|---|---|---|
| JP | 2004-289531 A | 10/2004 |
| JP | 2005-033671 A | 2/2005 |
| JP | 2006-086667 A | 3/2006 |
| JP | 2006-186673 A | 7/2006 |
| JP | 2007-074582 A | 3/2007 |
| JP | 2007-312011 A | 11/2007 |

OTHER PUBLICATIONS

Math League, "Ratio and Proportion," Math League Press, 2006, 4 pages.*
JP Office Action dated Jan. 24, 2012 as received in related application No. 2007-322551.
JP Office Action dated Jan. 24, 2012 as received in related application No. 2007-32551.

* cited by examiner

*Primary Examiner* — Carl Colin
*Assistant Examiner* — John Elmore
(74) *Attorney, Agent, or Firm* — Maschoff Brennan

(57) ABSTRACT

A mobile terminal device includes a recording setting unit configured to set a programmed recording based on an input of programmed-recording information that is used for performing programmed recording of a broadcast program, a reception-state checking unit configured to start a tuner at a predetermined time before a recording start time set by the recording setting unit and continuously checking a reception state of broadcast radio waves until the recording start time, a notifying unit configured to notify, if the reception-state checking unit determines that the reception state of the broadcast radio waves is not a desired reception state, a notification indicating so, and a recording starting unit configured to start recording processing of the broadcast program if the reception-state checking unit determines that the reception state of the broadcast radio waves is the desired reception state.

9 Claims, 5 Drawing Sheets

MOBILE TERMINAL DEVICE

BACKGROUND OF THE INVENTION

1. Field of the Invention

The present invention relates to a mobile terminal device having a programmed-recording function. In particular, the present invention relates to a mobile terminal device that controls a programmed-recording function while recognizing a reception state.

2. Description of the Related Art

Today, mobile terminal devices, such as cellular phones, that have a television viewing/listening function based on a digital terrestrial broadcasting are available. Some of the mobile terminal devices have a function for recording video received via a digital terrestrial broadcasting, a function for recording video and audio data in internal memories of the mobile terminal devices or external memories during viewing/listening of the television, and a programmed-recording function for allowing a user to set programmed-recording information such as recording start time and automatically starting a recording function by using a timer.

Since the mobile terminal devices having the television viewing/listening function and the programmed-recording function are becoming smaller in size and lighter in weight and are used while on the go and while on the move, there are problems as follows.

As a first problem, the mobile terminal devices having the television viewing/listening function need to accomplish stable playback processing and recording processing of video data and audio data, based on the fact that the reception state of broadcast radio waves received from a broadcast station varies due to the movement.

As a second problem, a cellular phone, which is one example of the mobile terminal devices, requires a large power capacity in order to ensure long-term operation of the television viewing/listening function and the recording function in addition to a conventional verbal-communication function and a web-communication function. However, the mobile terminal device having a large power capacity leads to an increase in the manufacturing cost and an increase in the size of the mobile terminal device. Thus, it is necessary to reduce the power consumed for the television viewing/listening function and the recording function in order to ensure long-term operation of the mobile terminal device.

As a third problem, the mobile terminal device requires a memory capacity that ensures long-term recording, when the recording function of the mobile terminal device is used to record a broadcast program. Thus, the mobile terminal device may be provided with a large-capacity internal memory or external memory, but such a configuration leads to an increase in the manufacturing cost and an increase in the size of the mobile terminal device; It is necessary to prevent unwanted consumption of the memory in order to ensure long-term recording of a broadcast program and so on.

In order to overcome the above-described problems, Japanese Unexamined Patent Application Publication No. 2007-74582 (Patent Document 1) discloses a mobile terminal device that prevents battery or memory consumption due to unwanted recording of video data and audio data having low reception qualities. In Patent Document 1, before the recording using the programmed-recording function is started, the mobile terminal device measures reception quality of a broadcast program and notifies a user whether or not the broadcast program can be stably recorded.

Japanese Unexamined Patent Application Publication No. 2006-86667 (Patent Document 2) discloses a mobile wireless terminal that eliminates memory and power consumption due to unwanted recording processing. In Patent Document 2, when the programmed-recording function is used to perform video and audio recording processing and the reception quality that is determined from electric field strength decreases, the recording processing is stopped and a notification indicating so is notified a user.

In Patent Document 1, when the mobile terminal device measures the reception quality for a broadcast program to be subjected to the recording processing and the reception quality decreases, the mobile terminal device notifies only that the reception quality decrease. Thus, even if the reception quality improves after notifying the user, the mobile terminal device cannot perform recording processing of a broadcast program on which the user desires to perform the recording processing. In addition, Patent Document 1 does not give any consideration to the amount of power consumption involved in the measurement of the reception quality.

Patent Document 2 does not give any consideration to the reception quality of broadcast radio waves before programmed-recording start time. Also, during execution of the recording processing, even when the user requires an appropriate recording quality for each broadcast program on which he or she desires to perform recording processing, the user's intension cannot be sufficiently reflected.

SUMMARY OF THE INVENTION

The present invention has been accomplished in view of such situations, and an object of the present invention is to provide a mobile terminal device that recognizes the reception state of broadcast radio waves and efficiently controls a programmed-recording function in accordance with the reception state, thereby reducing the amount of memory consumed and the amount of power consumed.

This and other objects can be achieved according to the present invention by providing a mobile terminal device comprising:

a recording setting unit configured to set a programmed recording based on an input of programmed-recording information that includes at least a recording start time and a recording end time and that is used for performing programmed recording of a broadcast program;

a reception-state checking unit configured to start a tuner at a predetermined time before the recording start time set by the recording setting unit and continuously checking a reception state of broadcast radio waves until the recording start time;

a notifying unit configured to notify, if the reception-state checking unit determines that the reception state of the broadcast radio waves is not a desired reception state, a notification indicating that the reception state of the broadcast radio waves is not a desired reception state; and a recording starting unit configured to start recording processing of the broadcast program if the reception-state checking unit determines that the reception state of the broadcast radio waves is the desired reception state.

It may be desire the recording starting unit starts the recording processing of the broadcast program when the reception-state checking unit determines that the reception state of the broadcast radio waves is the desired reception state or when the recording start time included in the programmed-recording information is reached.

The mobile terminal device of the above aspect may further comprise at least one of a movement detecting unit configured to continuously detect movement of the mobile terminal device and a timer for counting predetermined periods after the recording start time is passed until the recording processing is start, it may be desired that if the movement detecting unit detects the movement of the mobile terminal device or if the timer expires, the reception-state checking unit starts the tuner and checks the reception state of the broadcast radio waves; upon determining that the reception state of the broadcast radio waves is not a desired reception state, the reception-state checking unit stops the tuner; and upon determining that the reception state of the broadcast radio waves is a desired reception state, the recording starting unit starts the recording processing of the broadcast program.

The mobile terminal device of the above aspect may further comprise: a extending unit configured to extend the predetermined periods counted by the timer, if the reception-state checking unit determines that the reception state of the broadcast radio waves is not the desired reception state.

It may be desire that the reception-state checking unit checks the reception state of the broadcast radio waves by using control information that the mobile terminal device obtains from the broadcast radio waves.

It may be further desire that the reception-state checking unit checks the reception state of the broadcast radio waves by using control information that the mobile terminal device obtains from the broadcast radio waves.

The mobile terminal device of the above aspect may further comprise: a reception-quality checking unit configured to check a reception quality of the broadcast radio waves received in each predetermined period, if the reception-state checking unit determines that the reception state of the broadcast radio waves is the desired reception state and the recording processing is started; a recording suspending unit configured to notify, if the reception-quality checking unit determines that the reception quality is lower than an arbitrary set threshold, a notification indicating that the reception quality is lower than an arbitrary set threshold and to suspend the recording processing; and a recording managing unit configured to continue the recording processing if the reception-quality checking unit determines that the reception quality is higher than or equal to the arbitrary set threshold or to resume the recording processing if the recording suspending unit suspended the recording processing.

The mobile terminal device of the above aspect may further comprise: a reception-quality checking unit configured to check a reception quality of the broadcast radio waves received in each predetermined period, if the reception-state checking unit determines that the reception state of the broadcast radio waves is the desired reception state and the recording processing is started; a recording suspending unit configured to notify, if the reception-quality checking unit determines that the reception quality is lower than an arbitrary set threshold, a notification indicating the reception quality is lower than an arbitrary set threshold and to suspend the recording processing; and a recording managing unit configured to continue the recording processing if the reception-quality checking unit determines that the reception quality is higher than or equal to the arbitrary set threshold or to resume the recording processing if the recording suspending unit suspended the recording processing.

It may be desire that the reception-quality checking unit checks the reception quality based on a reception rate determined from a ratio between an amount of reference data pre-stored in the mobile terminal device and obtained in a predetermined time and an amount of reception data actually obtained by the mobile terminal device in the predetermined time.

It may be desire that the reception-quality checking unit checks the reception quality based on a reception rate determined from a ratio between an amount of reference data pre-stored in the mobile terminal device and obtained in a predetermined time and an amount of reception data actually obtained by the mobile terminal device in the predetermined time.

It may be desire that the reception-quality checking unit individually obtains the reception rate of video data contained in the broadcast radio waves and the reception rate of audio data contained in the radio waves, and the threshold for the reception quality comprises a threshold for the reception rate of the video data and a threshold for the reception rate of the audio data, the thresholds being individually and arbitrarily set.

It may be desire that the reception-quality checking unit individually obtains the reception rate of video data contained in the broadcast radio waves and the reception rate of audio data contained in the radio waves, and the threshold for the reception quality comprises a threshold for the reception rate of the video data and a threshold for the reception rate of the audio data, the thresholds being individually and arbitrarily set.

Since the mobile terminal device according to the present invention recognizes the reception state of broadcast radio waves and efficiently controls a programmed-recording function in accordance with the reception state, it is possible to reduce the amount of memory consumption and the amount of power consumption.

The nature and further characteristic features of the present invention will be made clear from the following descriptions made with reference to the accompanying drawings.

DESCRIPTION OF THE PREFERRED EMBODIMENT

A mobile terminal device according to an embodiment of the present invention will be described below with reference to the accompanying drawings.

Figure 1:
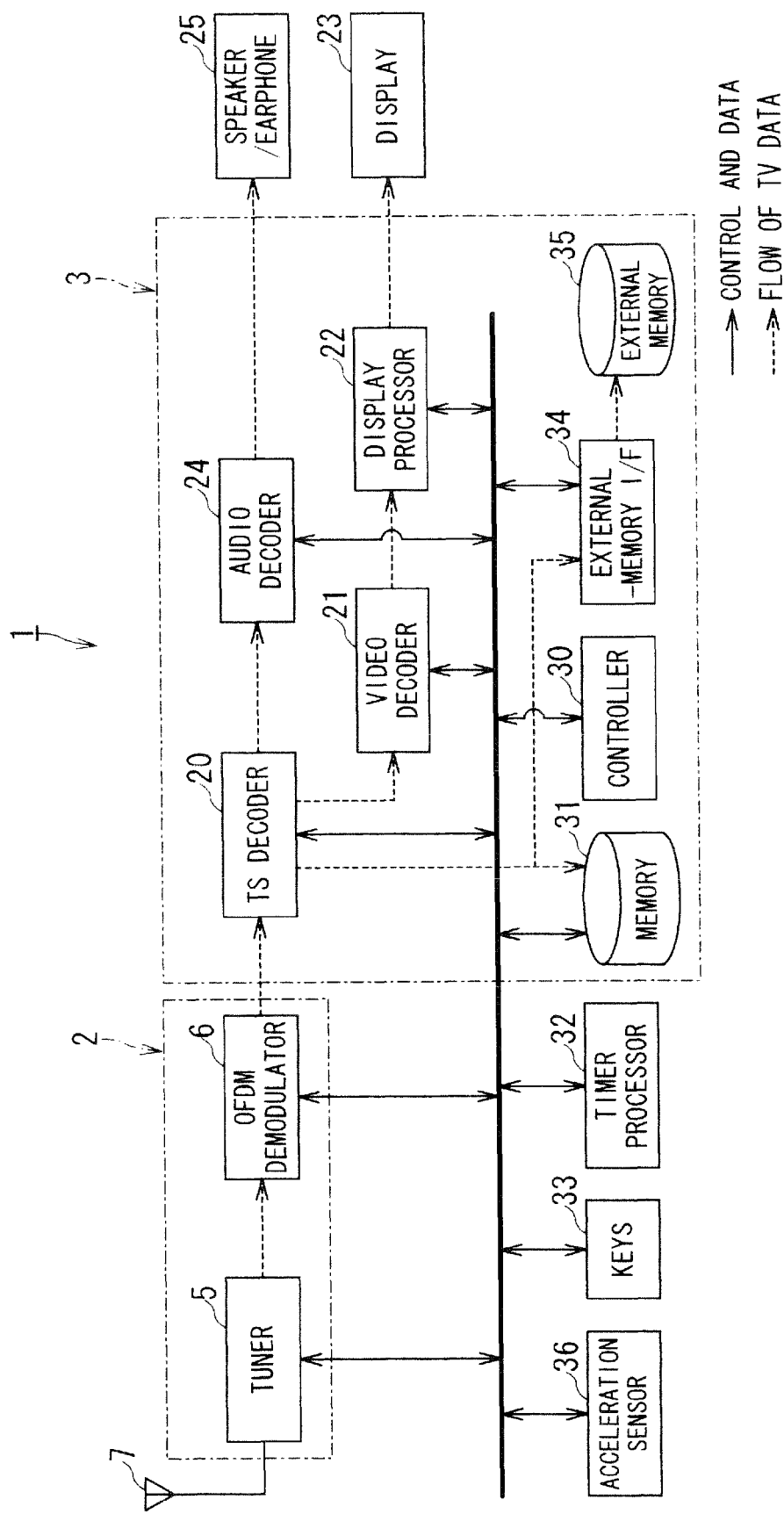
FIG. 1 is a schematic block diagram of a case in which a mobile terminal device according to the present invention is applied to a cellular phone.

FIG. 1 is a schematic block diagram showing a case in which a mobile terminal device according to the present invention is applied to a cellular phone 1. The cellular phone 1 of the present embodiment has a program viewing/listening function that allows viewing/listening of a broadcast program through reception of digital-terrestrial-broadcast radio waves and a programmed-recording function for programming recording of a broadcast program through reception of inputs of programmed-recording information from a user.

The cellular phone 1 has a front-end (pre-processing) section 2 and a back-end (post-processing) section 3 that achieve the program viewing/listening function and the programmed-recording function.

The front-end section 2 includes a tuner 5 and an OFDM (Orthogonal Frequency Division Multiplexing) demodulator 6. The tuner 5 tunes into signals in a specified frequency from a digital terrestrial broadcasting station (not shown) via an antenna 7 and extracts a TS (Transport Stream). The TS is obtained by time-division multiplexing an ES (Elementary Stream), which is a stream of individually encoded video data and audio data, for each transmission unit called a TS packet.

The OFDM demodulator 6 performs processing, such as code demodulation processing, error correction processing, and frame reconfiguration processing, on the extracted TS.

Figure 2A:
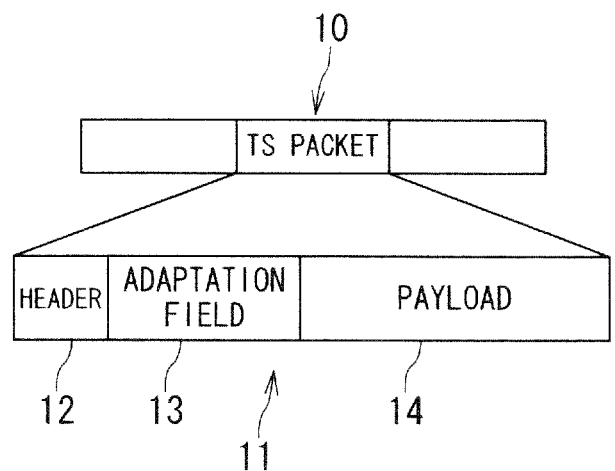
FIGS. 2A and 2B are diagrams illustrating the data structure of broadcast radio waves that a tuner receives from a digital terrestrial broadcasting base station.

FIG. 2A illustrates the data structure of TS packets 11. The TS packets 11 each have a fixed length of 188 bytes, and a continuous stream of the TS packets 11 provides a TS 10. Each TS packet 11 has a header 12, an adaptation field 13, and a payload 14. The header 12 states information regarding the TS packet 11, such as the presence/absence of the adaptation field 13.

The adaptation field 13 contains invalid data and additional information regarding the TS packet 11, and may or may not exist depending on the TS packet 11.

The payload 14 contains PES (Packetized Elementary Stream) packets, which are packetized ESs, and control information having a section format.

Figure 2B:
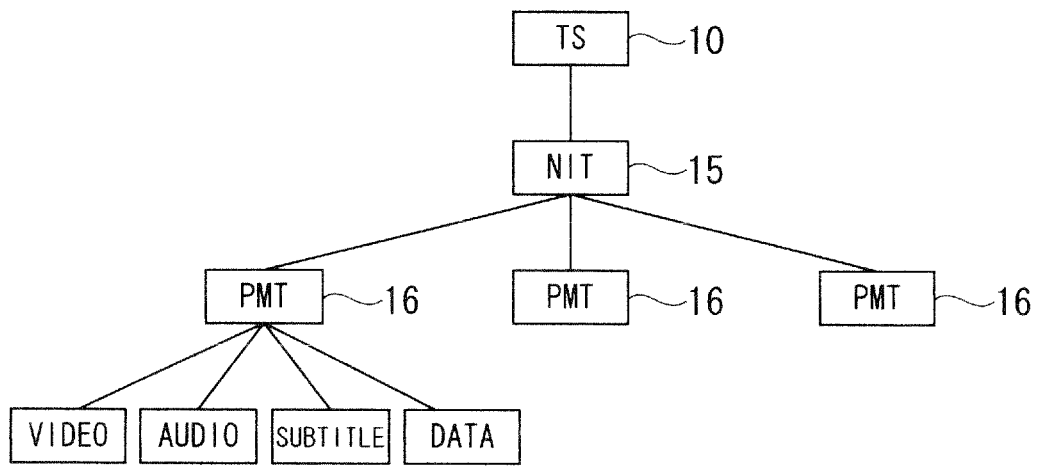

FIG. 2B schematically illustrates the structure of the section-format control information in the payload 14 of the TS packet 11. The section-format control information is referred to as "PSI" (Program Specific Information) and specifies some types of information, such as an NIT (Network Information Table) 15 and a PMT (Program Map Table) 16, required for a TS decoder 20 to process the TS 10.

The NIT 15 is a table that states information regarding the physical configuration of a transmission path and characteristics of a network. Based on a network ID stated in the NIT 15, the cellular phone 1 determines through which network a signal that is currently being received is transmitted and determines whether or not the signal can be received and reproduced.

The PMT 16 is a table for identifying the TS packets 11 for transmitting a video, audio, and data streams that constitute a channel. The PMT 16 is provided for each channel. Specifying a PID (Packet Identifier), which serves as a packet identifier of each stream that constitutes a channel, allows decoding of video, audio, and so on that are to be restored from a payload 14 having the same PID.

The NIT 15 and the PMT 16 contain information needed to decode the PES of a broadcast program. In the present embodiment, the NIT 15 and the PMT 16 are used as control information to determine a reception state.

The back-end section 3 processes the TS 10 output from the front-end section 2. The TS decoder 20 performs processing for extracting a necessary stream from the TS 10 in which multiple streams, such as video ESs and audio ESs, are multiplexed.

A video decoder 21 decodes the video ESs, which are encoded based on a H.264/AVC system, output from the TS decoder 20 and outputs video signals to a display processor 22. The decoded video signals are then displayed on a display 23, such as an LCD (Liquid Crystal Display), PDP (Plasma Display Panel), organic EL (ElectroLuminescence) display, or SED (Surface-conduction Electron-emitter Display).

An audio decoder 24 decodes audio ESs, which are encoded based on an MPEG-2 AAC (Advance Audio Coding) system, output from the TS decoder 20 and outputs audio signals to a speaker/earphone 25 or the like.

The back-end section 3 includes a controller 30, a memory 31 an external memory interface (I/F) 34, and an external memory 35. The controller 30 includes a CPU (Central Processing Unit), a ROM (Read Only Memory), a RAM (Random Access Memory), and so on. The CPU executes various types of processing in accordance with programs stored in the ROM or application programs loaded from the memory 31 to the RAM. The CPU also generates various control signals and supplies the control signals to the individual units to control the cellular phone 1. The RAM stores data and so on needed for the CPU to execute the various types of processing, as required. The controller 30 has a built-in timer for accurately measuring current date and time.

The memory 31 is implemented by a flash memory device or a HDD (Hard Disc Drive), and stores various data, such as broadcast-program video data and audio data subjected to recording processing by the recording function.

The external memory interface (I/F) 34 has a slot into/from which the external memory 35, such as a memory card, is inserted/detached. The external memory 35 is one type of flash memory cards including NAND flash memory cards and NOR flash memory cards. The external memory 35 allows various types of data, such as images, sound, and music, to be written and read via a 10-pin terminal.

The cellular phone 1 has a timer processor 32, keys 33, and an acceleration sensor 36.

The timer processor 32 performs timer processing needed for executing various types of processing. In the present embodiment, the timer processor 32 operates a next-start timer T1 for counting predetermined periods in reception-state determination processing before the start of recording and a timer T2 for counting predetermined periods in reception-rate check processing during execution of recording processing.

The keys 33 are used by the user to input various instructions to the cellular phone 1. In the present embodiment, the keys 33 are used to receive inputs of programmed-recording information for achieving the programmed-recording function.

The acceleration sensor 36 detects a change in acceleration in three-axis directions, i.e., forward and backward directions, leftward and rightward directions, and upward and downward directions that are orthogonal to each other. In the present embodiment, the acceleration sensor 36 serves as movement detecting unit. The acceleration sensor 36 may detect a change in acceleration in not only the three-axis directions but also in two-axis directions or one-axis directions.

The program viewing/listening function and the programmed-recording function of the cellular phone 1 will now be described.

The controller 30 causes video data and audio data, obtained from the TS decoder 20, to be stored in the HDD serving as the memory 31 or the external memory 35 and executes recording processing of a given broadcast program. With respect to the broadcast program stored and recorded on the memory 31, the video decoder 21 and the display processor 22 sequentially performs decoding processing on video data, based on an instruction input from the user via the keys 33, and then outputs the resulting signals to the display 23. Similarly, the audio decoder 24 performs decoding processing on audio data, based on an instruction input from the user via the keys 33, and outputs the resulting signals to the speaker/earphone 25.

Figure 3:
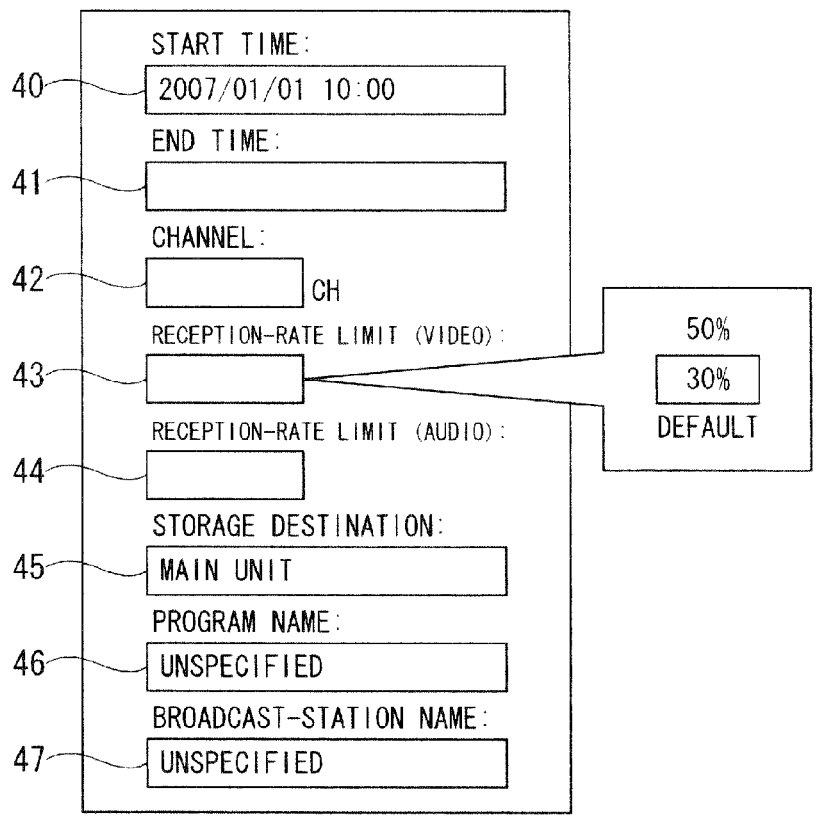
FIG. 3 is a schematic view showing programmed-recording-information input interface that receives inputs of programmed recording setting.

FIG. 3 shows a programmed-recording information input interface that is displayed on the display 23 of the cellular phone 1 and that receives inputs of programmed-recording information from the user. Under the control of the controller 30, the programmed-recording function is operated based on the programmed-recording information received from the user input via a programmed-recording-information input interface shown in FIG. 3 and stored in the memory 31.

The programmed-recording-information input interface has fields for inputting start time 40 and end time 41 of recording processing, a channel (CH) 42, a reception-rate limit (video) 43, a reception-rate limit (audio) 44, a storage destination 45 of a recorded broadcast program, a program name 46, and a broadcast-station name 47, which are examples of the programmed-recording information. After the cellular phone 1 receives the inputs of the programmed-recording information via the keys 33, the programmed-recording information is stored in the memory 31. The programmed-recording information may be configured such that, upon input of the recording start time and the channel, other programmed-recording information is automatically input based on program information pre-obtained via the antenna 7.

The reception-rate limits are thresholds for determining continuation of recording processing during the execution of broadcast-program recording processing. When the measured reception rates are greater than or equal to the reception-rate limits, the recording processing is continued or resumed, and when the measured reception rates are smaller than the reception-rate limits, the recording processing is suspended.

The reception rates are determined from ratios between the amounts of video and audio reference data, and the amounts of video and audio ES reception data received actually per predetermined time. That is, the reception rates indicate the reception qualities and are expressed by:

Reception Rate=Amount of Reception Data/Amount of Reference Data

The video and audio reception qualities increase as the reception rates increase. And the video and audio reception qualities decrease as the reception rate decrease. The amounts of video and audio reference date are known amounts of theoretical data calculated from reference bit rates per predetermined time.

For example, a QPSK (Quadrature Phase Shift Keying) system may be employ as the modulation system. In such a case, when the broadcast transmission speed is about 312 kbs, the transmission speed of video data is about 128 to 180 kbs and the transmission speed of audio data is about 48 to 64 kbps. The amount of reference date in the present embodiment can be obtained by determining an amount of reference data per predetermined time from the transmission speeds of the video data and the audio data.

Setting the predetermined time for measuring the reception rate to, for example, about 3 seconds, makes it possible to promptly respond to a reception-rate change involved in the movement of the cellular phone 1. Setting the predetermined time to a longer time, for example, about 10 seconds, makes it possible to reduce the number of measurement operations of the reception rate and thus makes it possible to reduce the power consumption.

The reception-rate limits may be arbitrarily set by the user with respect to the video reception-rate limit and the audio reception-rate limit, respectively. For example, the video reception-rate limit and the audio reception-rate limit may be set to 50% and 30%, respectively. With this arrangement, for example, when a television program on which recording processing is to be performed is a drama that the user does not want to miss and desires to perform the recording processing even when the recording quality is somewhat poor, setting the reception rates for both the video and audio to "default" makes it possible to continue the recording state during the broadcast time, regardless of the reception quality.

On the other hand, for a news program, the user may desire to record only audio. In such a case, setting the video reception-rate limit to 50% and setting the audio reception-rate limit to "default" makes it possible to ensure at least the audio recording state.

That is, when it is desired to reduce the memory consumption of the memory 31 and the external memory 35 during the recording processing, setting the reception-rate limit(s) higher makes it possible to prevent recording of video or audio having a low reception rate. Correspondingly, it is possible to prevent recording of video or audio having a low reception rate and a low reception quality and also is possible to reduce the consumption of the memory 31 and the external memory 35.

Next, a description will be given of processing executed by a programmed-recording function realized by the cellular phone 1. The programmed-recording function of the cellular phone 1 executes reception-state determination processing before the start of recording processing and reception-rate check processing during execution of the recording processing.

Figure 4:
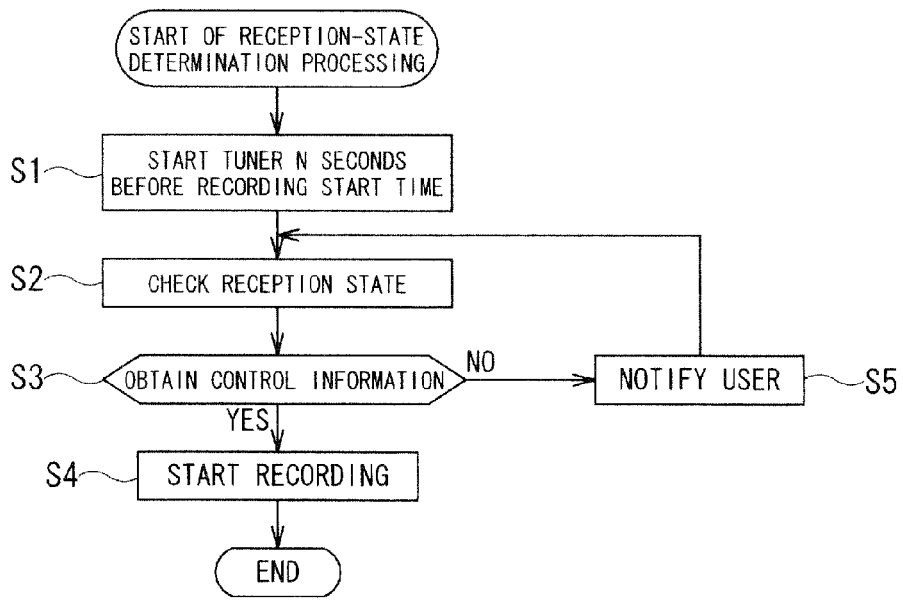
FIG. 4 is a flowchart illustrating reception-state determination processing before recording start time.

The reception-state determination processing before recording start time will now be described with reference to FIG. 4.

The reception-state determination processing is started N seconds before the recording start time, based on the programmed-recording information pre-input by the user via the programmed-recording-information input interface shown in FIG. 3.

In step S1, the controller 30 starts the tuner 5 N seconds before the recording start time. The time at which the reception-state determination processing is started is, preferably, about 30 seconds before the recording start time, as long as the time required for the reception-state determination processing is ensured.

In step S2, the TS decoder 20 checks the reception state of a channel (program) for which recording processing is to be executed. The TS decoder 20 receives signals from the digital terrestrial broadcasting station (not shown) via the antenna 7, and checks whether or not the NIT 15 and the PMT 16, which are control information and shown in FIG. 2B, are obtained, based on the TS 10 subjected to the code demodulation processing and so on performed by the OFDM demodulator 6.

In step S3, upon determining that the TS decoder 20 obtains the control information, the controller 30 starts recording processing of a predetermined broadcast program in step S4 and the reception-state determination processing ends.

On the other hand, in determination step S3, upon determining that the TS decoder 20 does not obtain the control information, i.e., when the cellular phone 1 does not receive broadcast radio waves, the controller 30 notifies for prompting the user to move to a place where the reception state is favorable since the broadcast radio waves cannot received. The notification to the user is displayed as a pop-up message on the display 23 or is notified by notifying unit, such as sound, vibration, or an LED. Based on the notification, the user can recognize that the broadcast radio-wave reception state of the cellular phone 1 is unfavorable and thus can take measures, such as moving to a place where the broadcast radio-wave reception state is favorable.

After the controller 30 notifies the user in notifying step S5, the reception-state determination processing returns to step S2 for checking the reception state. In the reception-state determination processing, when it is determined in determination step S3 that the control information is not obtained, the processing in steps S5, S2, and S3 is repeatedly performed in sequence, and when the recording start time is reached, the reception-state determination processing ends.

For the reception-state determination in reception-state checking step S2 and in determination step S3, not only the control information contained in the TS but also information, such as broadcast-radio wave C/N (Carrier to Noise) ratio information obtained from the tuner 5, may be used. In this case, a predetermined threshold for the C/N ratio information is preset, and when the threshold is exceeded, the reception-state determination processing is performed so as to start the recording processing. The time at which the recording processing is started in recording-start step S4 may be time before the recording start time after it is determined that the TS decoder 20 obtains the control information or may be time when the recording start time is reached.

Figure 5:
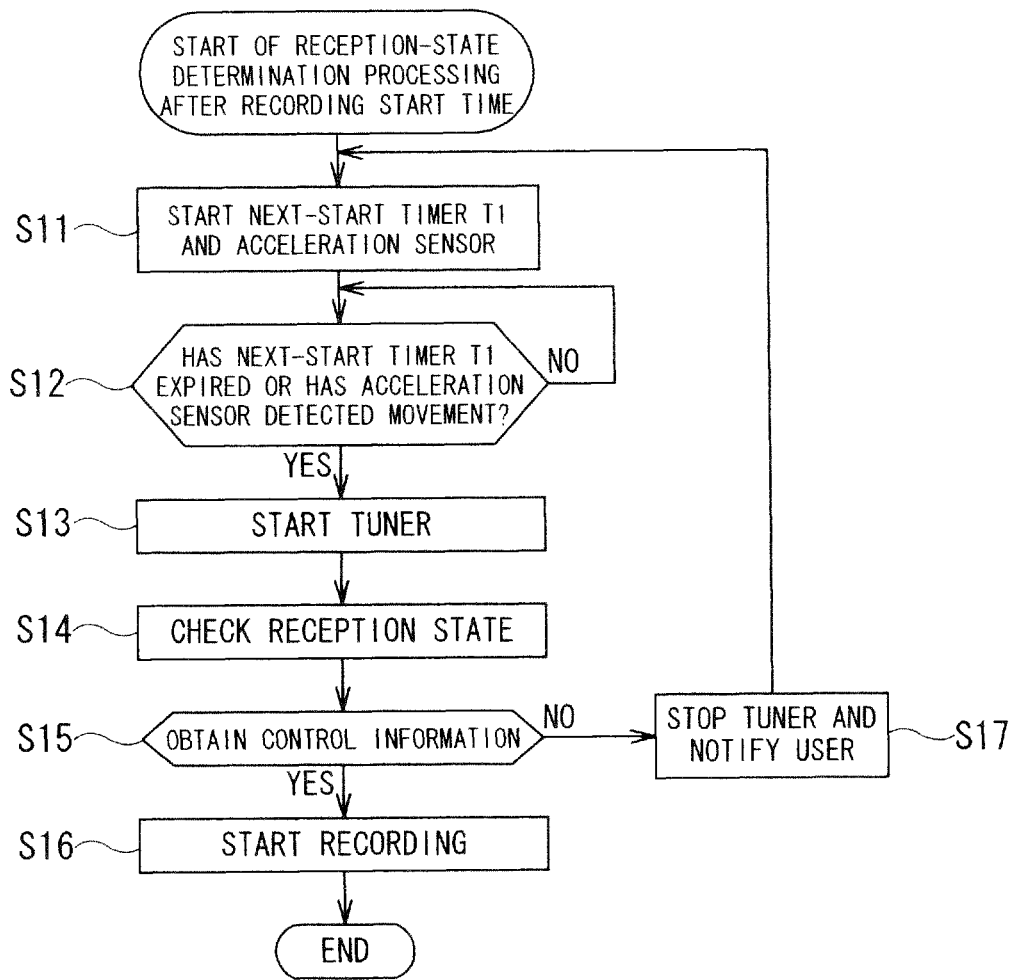
FIG. 5 is a flowchart illustrating reception-state determination processing after the recording start time.

The reception-state determination processing after the recording start time when the control information is not obtained even when the recording start time is reached and the reception-state determination processing before the recording start time is finished will now be described with reference to FIG. 5.

The reception-state determination processing is performed while intermittently operating the tuner 5 through the use of the timer processor 32 and the acceleration sensor 36. Performing the reception-state determination processing while intermittently operating the tuner 5 is effective in that it is possible to reduce the amount of power consumed by the cellular phone 1.

In step S11, the controller 30 causes the timer processor 32 to start the next-start timer T1 and also starts the acceleration sensor 36. The next-start timer T1 counts predetermined periods, such as 10-second periods.

In step S12, the controller 30 determines whether or not the next-start timer T1 expires or whether or not the acceleration sensor 36 detects the movement of the cellular phone 1. When the controller 30 determines the next-start timer T1 does not expire and the acceleration sensor 36 does not detect the movement of the cellular phone 1 in step S12, the processing stands by until the controller 30 determines that the next-start timer T1 expires or the acceleration sensor 36 detects the movement of the cellular phone 1.

On the other hand, when it is determined in determination step S12 that the next-start timer T1 expires or the acceleration sensor 36 detects the movement of the cellular phone 1, in step S13, the controller 30 resets the next-start timer T1, stops the acceleration sensor 36, and starts the tuner 5 to start reception of broadcast radio waves transmitted from the digital terrestrial broadcasting station. The next-start timer T1 and the acceleration sensor 36 may continuously perform counting and detection without resetting and stopping. When the next-start timer T1 is reset and the acceleration sensor 36 is stopped, it is effective in that the amount of power consumption can be reduced.

In step S14, under the control of the controller 30, the TS decoder 20 checks the reception state of a channel (a program) on which the recording processing is to be executed. Specifically, the TS decoder 20 checks whether not the NIT 15 and PMT 16, which are the control information shown in FIG. 2B, are obtained, based on the TS 10 received radio signals from the digital terrestrial broadcasting station (not shown) via the antenna 7 and subjected to the code demodulation processing performed by the OFDM demodulator 6.

When it is determined in step S15 that the TS decoder 20 obtains the control information, the controller 30 starts the recording processing of a given broadcast program in step S16, and the reception-state determination processing ends.

On the other hand, when it is determined in determination step S15 that TS decoder 20 does not obtain the control information, i.e., the cellular phone 1 does not receive broadcast radio waves, in step S17, the controller 30 stops the tuner 5 and notifies for prompting the user to move to a place where the reception state is favorable since broadcast radio waves are not received. The notification to the user is displayed as a pop-up message on the display 23 or is notified by notifying unit, such as sound, vibration, or an LED.

After the controller 30 notifies the user in notification step S17, the reception-state determination processing returns to step S11 in which the processing for starting the next-start timer T1 and the acceleration sensor 36 is performed, and the processing subsequent to step S11 is performed again. In tuner starting step S13, when the next-start timer T1 and the acceleration sensor 36 continuously perform counting and detection without resetting and stopping, the processing returns to determination step S12.

When it is determined in determination step S15 that the control information is not obtained, the processing in step S17, S11, S12, and the subsequent steps is sequentially performed while the tuner 5 is intermittently operated. When the recording end time is reached, the reception state determination processing ends.

When the reception state of broadcast radio waves is not satisfactory before the recording start time, the cellular phone 1 notifies the user. Further, after notifying, the cellular phone 1 continuously performs the reception-state determination processing until the recording start time and performs the reception-state determination processing while intermittently operating the tuner 5 after the recording start time. This arrangement allows the power consumption to be reduced and also allows efficient recognition of the reception state.

Since the intermittent operation of the tuner 5 is controlled based on the presence/absence of the movement of the cellular phone 1 or the expiration of the next-start timer T1 in the reception-state determination processing after the recording start time, it is possible to prevent unnecessary start of the tuner 5 when an improvement in the reception state cannot be expected and it is possible to reduce the power consumption.

In addition, since the reception-state determination processing is continuously performed-until the recording start time and the reception-state determination processing is performed with the intermittent operation until the recording end time, it is possible to meet the need of users who wish to view/listen to programs with programmed recording.

Although the movement of the cellular phone 1 is detected using the acceleration sensor 36 to control the intermittent operation of the tuner 5, the present invention is not limited to thereto. That is, other means that can determine whether or not an improvement in the reception state of the cellular phone 1 can be expected may be used. For example, a GPS function or base-station information may be used to detect the movement of the cellular phone 1.

Although the determination of the expiration of the next-start timer T1 and the detection of the movement of the cellular phone 1 through the use of the acceleration sensor 36 are performed to control the intermittent operation of the tuner 5, only one of the determination of the expiration and the detection of the movement may be used.

In addition, when it is repeatedly determined in determination step S15 that the control information cannot be obtained and no improvement in the reception state can be expected, the controller 30 may extend the count periods of the next-start timer T1. This arrangement extends the intervals of the intermittent operation of the tuner 5, thus making it possible to reduce the working time of the tuner 5 and to efficiently reduce the power consumption.

Figure 6:
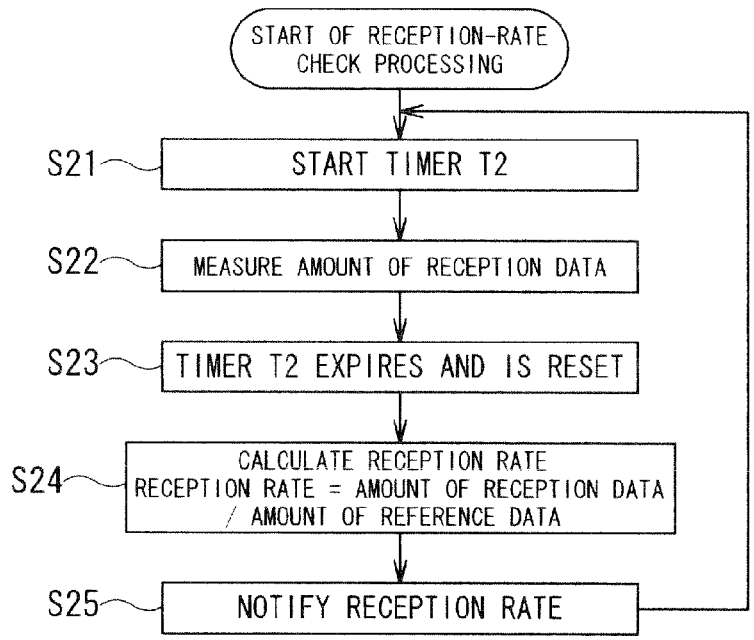
FIG. 6 is a flowchart illustrating reception-rate check processing performed after the start of recording.

Reception-rate check processing after the start of recording will now be described with reference to FIG. 6. This reception-rate check processing is started after recording start step S4 in the reception-state determination processing shown in FIG. 4 and recording start step S16 in the reception-state determination processing performed after the recording start time shown in FIG. 5. The reception-rate check processing is performed by the TS decoder 20.

In step S21, the TS decoder 20 causes the timer processor 32 to start the timer T2. The timer T2 counts predetermined periods, such as 10-second periods.

In step S22, the TS decoder 20 measures the amount of reception data for a predetermined time until the timer T2 expires. The Ts decoder 20 measured for video data and audio data. In step S23, after the timer T2 expires, the TS decoder 20 resets the timer T2.

In step S24, the TS decoder 20 calculates reception rates from the amount of reception data obtained in step S22 in which the amount of reception data is measured and the amounts of video and audio reference data which are known theoretical amounts of data calculated from reference bits rate per predetermined time. The reception rates are determined from ratios between the amounts of video and audio reference data calculated from reference bit rates per predetermined time and the amounts of video and audio ES reception data actually received per predetermined time. The reception rates are determined for the video data and the audio data, respectively.

In step S25, the TS decoder 20 notifies the controller 30 that the video-data and audio-data reception rates obtained in reception-rate calculating step S24.

Thereafter, the process returns to step S21, and the timer processor 32 starts the timer T2 again and the processing in step S22 and the subsequent steps is repeated.

When the TS decoder 20 repeatedly performs the reception-rate check processing and the controller 30 refers to the timer and determines that the recording end time is reached, the processing ends.

Figure 7:
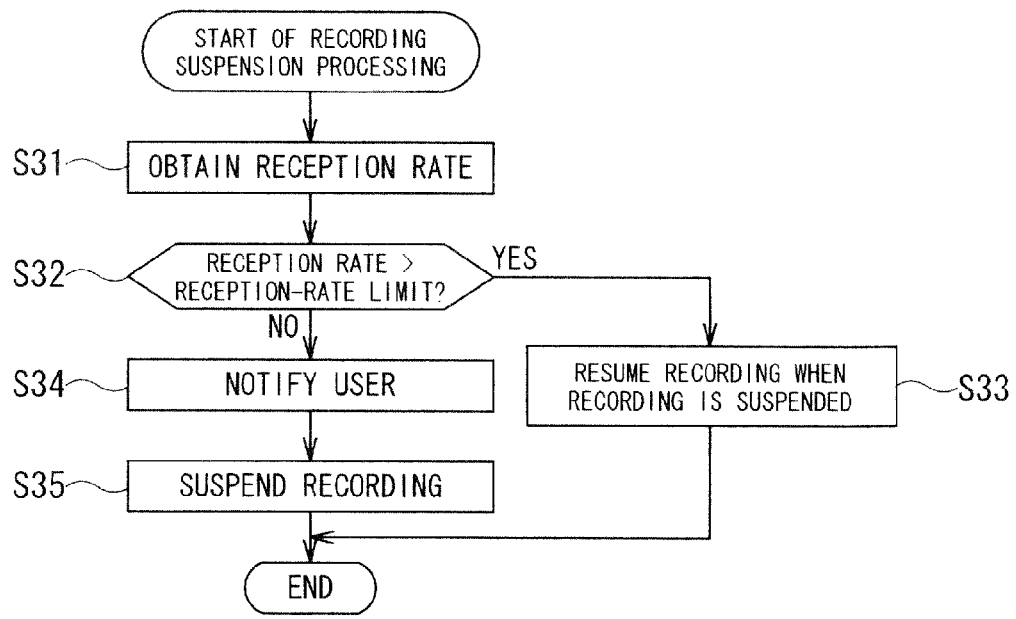
FIG. 7 is a flowchart illustrating recoding suspension processing performed when a reception rate decreases.

On the other hand, upon receiving the reception rates, the controller 30 performs processing for suspending the recording, based on the values of the reception rates. FIG. 7 is a flowchart illustrating the recording suspension processing performed by the controller 30 that has received the reception-rate notification from the TS decoder 20.

In step S31, the controller 30 obtains the video-data and audio-data reception rates from the reception-rate notification from the TS decoder 20.

In step S32, the controller 30 compares the reception rate with a reception-rate limit. When the controller 30 determines that the reception rate is greater than the reception-rate limit, the recording suspension processing ends since a required reception quality that is sufficient to continue the recording processing has been obtained.

At this point, when the recording processing has already been suspended in recording suspension step S35 described below, the controller 30 resumes the recording processing in step S33, and the recording suspension processing ends.

On the other hand, upon determining that the reception rate is smaller than the reception-rate limit, in step S34, the controller 30 notifies the user that the reception rate is lower than the reception-rate limit and prompting the suspension of the recording processing. The notification to the user is displayed on the display 23, a pop-up message indicating that the reception rate is smaller than the reception-rate limit or is notified by using notifying unit, such as sound, vibration, or an LED. Based on the notification, the user can recognize that reception data that is required for the reception rate of the cellular phone 1 to exceed the reception-rate limit is not received, and thus can take measures, such as moving to a place where the reception state is favorable.

In step S35, the controller 30 suspends the recording processing, and the recording suspension processing ends. The suspension of the recording processing is continued until the controller 30 determines that the reception rate obtained from the TS decoder 20 is greater than the reception-rate limit in reception-rate obtaining step S31.

During the execution of the recording processing, the cellular phone 1 controls the recording processing, based on the reception-rate limits set by the user. This arrangement makes it possible to meet the user's demand and also makes it possible to reduce the amounts of unwanted memory and power consumptions involved in unnecessary recording processing. In addition, the reception rates for the video data and the audio data are compared with the corresponding reception-rate limits. Thus, it is possible to record only required data and is possible to further reduce the memory capacity and the amount of power consumption.

Although both reception rates of the video data and the audio data have been used to determine the reception quality in the above description, either of the reception rates may be used or the reception rate of the entire ES may be used for the determination.

Thus, the cellular phone according to the present invention checks the reception state and the reception quality before the start of the recording processing and during execution of the recording processing to control the recording function, thereby making it possible to efficiently reduce the amount of power consumption and the amount of memory consumption. In addition, the cellular phone individually determines the reception state of the video data and the reception state of the audio data, thereby making it possible to achieve the user's requirement for the recording quality corresponding to broadcast programs and memory capacities.

Moreover, the control information including the NIT and PMT is used as determination conditions before the start of recording, and the reception rates that can be arbitrarily set by the user are used after the start of the recording. Thus, it is possible to reflect the user's individual needs, such as wishing to record broadcast programs even if the recording qualities thereof are low.

Although a case in which the present invention is applied to a cellular phone that is capable of receiving a digital terrestrial broadcasting has been described in the above embodiment as one example of the mobile terminal device, the present invention is not limited thereto. For example, the present invention is also applicable to a mobile terminal device that is capable of receiving an analog broadcasting and/or a radio broadcasting (e.g., digital terrestrial audio broadcasting) or a mobile terminal device that is capable of receiving video and audio signals through a network.

In the above description, for determination of the reception state, the control information including the NIT and the PMT is used before the start of recording and the reception rate is used during execution of the recording processing. However, other values that allow determination of the reception state and reception rates may be used. Examples of such values include values of electric field strength, a bit error rate, and a packet error rate.

The present invention is applicable to not only cellular phones but also PDA (Personal Digital Assistants), personal computers, mobile game consoles, mobile music players, mobile moving-picture players, on-board navigation systems, and other mobile terminal devices.

The series of processing described in the embodiment of the present invention can also be executed by software or can be executed by hardware.

Additionally, although the above-described embodiment of the present invention has been given of an example of processing in which the steps in the flowcharts are time-sequentially performed according to the described sequence, the steps do not necessarily have to be time-sequentially processed. For example, the steps may be executed in parallel or independently.

What is claimed is:

1. A mobile terminal device comprising a processing unit, the processing unit configured to:
    set a programmed recording based on an input of programmed-recording information that includes at least a recording start time and a recording end time and that is used for performing programmed recording of a broadcast program;
    start a tuner at a predetermined time before the recording start time and continuously check a reception state of broadcast radio waves until the recording start time;
    notify, if the processing unit determines that the reception state of the broadcast radio waves is not a desired reception state, a notification indicating that the reception state of the broadcast radio waves is not a desired reception state;
    start recording processing of the broadcast program if the processing unit determines that the reception state of the broadcast radio waves is the desired reception state; and
    check a reception quality based on a reception rate determined from a ratio between an amount of reference data pre-stored in the mobile terminal device and obtained in a predetermined time from transmission speeds of the broadcast radio waves and an amount of reception data actually obtained by the mobile terminal device in the predetermined time,
    wherein:
    the mobile terminal device further comprises a movement detecting unit configured to continuously detect a movement of the mobile terminal device after the recording start time is passed and before the recording processing is started;
    upon detection of the movement of the mobile terminal device, the processing unit starts the tuner and checks the reception state of the broadcast radio waves;
    upon determining that the reception state of the broadcast radio waves is not a desired reception state, the processing unit stops the tuner; and
    upon determining that the reception state of the broadcast radio waves is a desired reception state, the processing unit starts the recording processing of the broadcast program.

2. The mobile terminal device according to claim 1, wherein the processing unit starts the recording processing of the broadcast program when the processing unit determines that the reception state of the broadcast radio waves is the desired reception state or when the recording start time included in the programmed- recording information is reached.

3. The mobile terminal device according to claim 1, further comprising a timer for counting predetermined periods after the recording start time is passed until the recording processing is started,
    wherein, the processing unit starts the tuner and checks the reception state of the broadcast radio waves; upon determining that the reception state of the broadcast radio waves is not a desired reception state, the processing unit stops the tuner; and upon determining that the reception state of the broadcast radio waves is a desired reception state, the processing unit starts the recording processing of the broadcast program.

4. The mobile terminal device according to claim 3, wherein the processing unit is further configured to extend the predetermined periods counted by the timer, if processing unit determines that the reception state of the broadcast radio waves is not the desired reception state.

5. The mobile terminal device according to claim 3, wherein the processing unit checks the reception state of the broadcast radio waves by using control information that the mobile terminal device obtains from the broadcast radio waves.

6. The mobile terminal device according to claim 3, wherein the processing unit is further configured to:
    check a reception quality of the broadcast radio waves received in each predetermined period, if the processing unit determines that the reception state of the broadcast radio waves is the desired reception state and the recording processing is started;
    notify, if the processing unit determines that the reception quality is lower than an arbitrary set threshold, a notification indicating the reception quality is lower than an arbitrary set threshold and to suspend the recording processing; and
    continue the recording processing if the processing unit determines that the reception quality is higher than or equal to the arbitrary set threshold or to resume the recording processing if the processing unit suspended the recording processing.

7. The mobile terminal device according to claim 6, wherein the processing unit individually obtains the reception rate of video data contained in the broadcast radio waves and the reception rate of audio data contained in the radio waves, and a threshold for the reception quality comprises a threshold for the reception rate of the video data and a threshold for the reception rate of the audio data, the thresholds being individually and arbitrarily set.

8. The mobile terminal device according to claim 1, wherein the processing unit checks the reception state of the broadcast radio waves by using control information that the mobile terminal device obtains from the broadcast radio waves.

9. The mobile terminal device according to claim 1, wherein the processing unit individually obtains the reception rate of video data contained in the broadcast radio waves and the reception rate of audio data contained in the radio waves, and the threshold for the reception quality comprises a threshold for the reception rate of the video data and a threshold for the reception rate of the audio data, the thresholds being individually and arbitrarily set.

* * * * *